Sept. 20, 1949.  F. H. MUELLER ET AL  2,482,687
SERVICE T
Filed Sept. 12, 1947

Inventors
FRANK H. MUELLER
JOHN J. SMITH

Cushman Darby Cushman
Attorneys

Patented Sept. 20, 1949

2,482,687

UNITED STATES PATENT OFFICE 2,482,687

SERVICE T

Frank H. Mueller and John J. Smith, Decatur, Ill., assignors to Mueller Co., Decatur, Ill., a corporation of Illinois Application September 12, 1947, Serial No. 773,638

3 Claims. (Cl. 285—108)

The present invention relates to a new and improved service T for use in drilling and plugging gas or water mains.

Heretofore it has been the practice to make steel service T's for high pressure gas and water mains from a solid drop forging which is axially machine-bored and has a lateral branch outlet. The outer end of the bore is reduced and internally threaded so as to provide a restricted upper end portion for receiving a closure plug. Such a service T fitting is disclosed in the Bowan et al. patent, 2,310,351, Feb. 9, 1943, and has been found to have the following serious disadvantages: (1) It does not permit a full size gas outlet to be drilled in the gas main, (2) the wall of the bore cannot be utilized as a drill guide and (3) when it is desired to insert a rubber stopper in the bore, a small stopper must be used with the result that it is necessary to distort the rubber excessively which fails to provide a secure shut-off valve or prevent the stopper from being blown out of the fitting due to the high pressure of the fluid in the main to which it is directly subjected.

Accordingly, an important object of the present invention consists in providing a service T in which the inside diameter of the bore is unrestricted throughout its axial length and the diameter of the inside thread at the upper end of the T is substantially the same as that of the bore or slightly larger so that a full size drill or rubber stopper may be freely inserted into the bore.

A further object consists in providing a service T with an unrestricted bore and in which the lower end of the bore adjacent the connection of the T with the main, is formed with an enlarged shoulder portion so that when the rubber stopper is inserted in the T and positioned within the enlarged shoulder portion, the rubber stopper expands back of the shoulder to positively lock the same against being blown out by the high pressure of the gas or water in the main.

Other objects and advantages of the invention will become apparent from the following description when taken in conjunction with the accompanying claims and drawings.

Referring to the drawings in which are disclosed several preferred embodiments of the invention:

Figure 1:
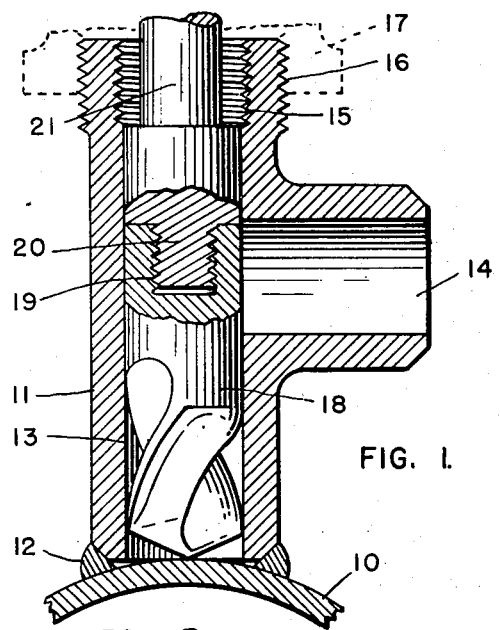
Figure 1 is a vertical sectional view of the service T and a partial transverse section of a main to which the T is welded or otherwise attached prior to receiving the drilling tool for tapping the main.
Figure 3:
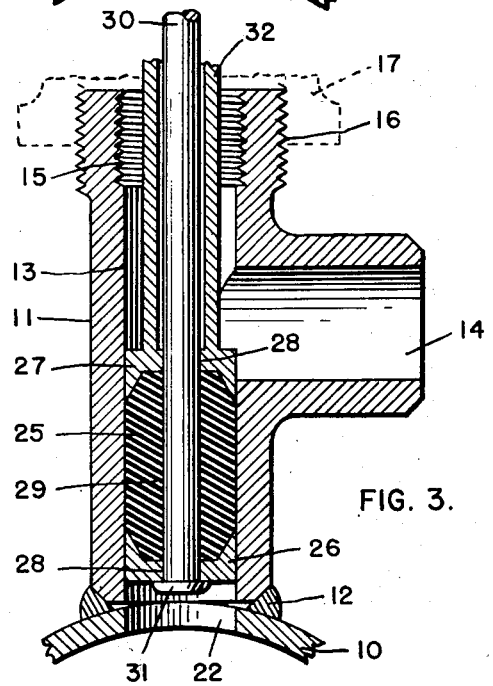
Figure 3 is a view similar to Figure 1 with the drilling tool removed after tapping the main and showing a removable rubber stopper inserted in the fitting.

Referring to the drawings in which like numerals indicate like parts, and more particularly Figure 1, 10 designates a gas or water pressure steel main to which the service T 11 is connected at the point where the fluid outlet opening is to be tapped. The lower end of the T is secured to the main as at 12 in any suitable manner such as by welding, soldering or the like. The service T 11 is formed with an axial through bore 13 and a lateral intermediate outlet 14 arranged to be suitably connected to a branch conduit, not shown. The outer or upper end of the T 11 is internally threaded as at 15 for receiving a complementary externally threaded closure plug, not shown. The upper end of the service T 11 may also be externally threaded as at 16 for detachably receiving the lower portion 17 of a drilling and plugging apparatus such as shown in the Mueller patent, 1,996,345, Apr. 2, 1935. The diameter of the internal threads 15 at the upper end of the service T is the same as the diameter of the bore 13 or may be slightly larger than the bore in order that a full size drill or rubber plug may be freely inserted into the bore. The service T 11 is connected to the main prior to the drilling of the fluid outlet opening in the main, and then a full size drill 18 of substantially the same diameter as the bore 13 is inserted and may be provided with an internally threaded socket 19 in its upper end for receiving the complementary external threads on a reduced stem portion 20 of an operating shaft or bar 21, which in turn is connected to a suitable operating means, not shown, for rotating the drill and feeding the same axially into drilling engagement with the main 10 so as to form a full size fluid outlet opening 22 therein, (Fig. 3) of substantially the same diameter as the diameters of the drill 18. It will be noted that the bore 13 is of uniform diameter and extends from the upper internal threaded portion 15 to the opposite or lower end of the service T 11, and that it substantially conicides with the diameter of the internal threaded portion 15 at its juncture therewith so as to be of unrestricted diameter throughout its length. Moreover, the wall of the bore throughout its length and on opposite sides of the lateral outlet 14, constitutes a guide for the drill 13 during its axial and rotary movement so as to insure the drill being maintained in proper drilling contact with the main.

Figure 2:
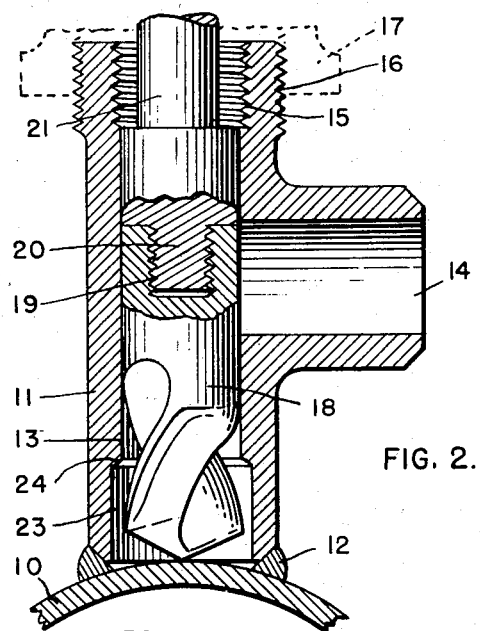
Figure 2 is a view similar to Figure 1 showing the lower portion of the T provided with an enlarged bore.

The form of the invention shown in Figure 2 is substantially the same as that shown in Figure 1 with the single exception that the bore 13 is provided with an enlarged portion 23 at its lower end, which forms a shoulder 24 at the juncture of the bore 13 therewith for a purpose which subsequently will be described.

After the fluid outlet opening 22 is tapped in the main 10, the drill 18 is removed from the service T 11 and a full size rubber stopper or plug 25 (Fig. 3) is inserted in the T for controlling the flow of the fluid from the main through the opening 22 into the branch conduit to which the service T is connected. The rubber stopper 25 is of substantially the same diameter as the bore 13 and may be carried by spaced end caps 26 and 27 which are formed with central openings 28 that align with a central axial opening 29 in the stopper 25 so as to receive a reciprocating operating shaft 30 connected at its lower end as at 31 to the cap 26. The cap 27 may have a tubular portion or sleeve 32 through which loosely extends the operating shaft 30 for moving the stopper 25 vertically relative to the service T 11 in order to control the flow of the fluid from the outlet opening 22 into and through the lateral outlet 14. It will be noted that the opening 22 in the main 10 is substantially of the same diameter as the bore 13 and the stopper 25 and the diameter of the bore 13 is such that a full size stopper may be inserted and guided in the service T, thus eliminating the necessity of distorting the rubber of the stopper excessively in order to insert it into the service T, and which would have to be done if a small stopper were used. Additionally, the stopper is of such a size as to completely shut off the opening 22 when it is desired to close the main.

Figure 4:
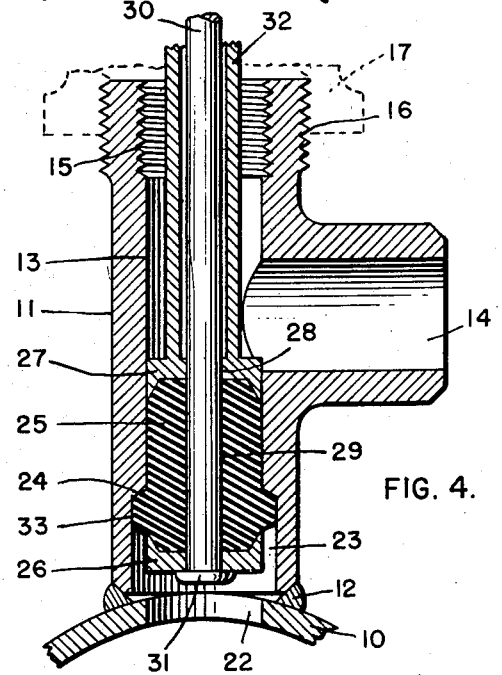
Figure 4 is a view similar to Figure 3 showing the T provided with an enlarged bore at the lower end thereof and adjacent the main.

In the modification shown in Figure 4, the service T 11 is similar to that shown in Figure 2, and the expansible rubber stopper 25 is arranged when it is moved into the enlarged portion 23 of the bore to expand outwardly as at 33 to engage the shoulder 24 and the wall of the enlarged bore portion in order to positively lock the stopper against being blown out from the service T by the high pressure of the gas or water in the main 10. The enlarged lower portion 23 of the bore 13 surrounds the outlet 22 of the main so that the welding connection 12 of the service T 11 to the main, is circumferentially spaced outwardly from the wall of the opening 22. This is particularly desirable when the service T 11 is made of steel and is welded to the main, since it has been found that the heat of the welding sometimes hardens the steel main for a short distance inside the point of connection of the T therewith, and this hardened portion is highly destructive to drills. The enlarged bore 23 makes it possible to drill a full size outlet opening 22 in the main without danger of the drill contacting with the hardened steel portion of the main.

It will be noted that in all forms of the invention the service T is connected to the main prior to the drilling of the fluid outlet opening 22, and that the bore 13 is of full size and unrestricted throughout its entire length so as to receive and constitute a guide for a full size drill 18 and a full size rubber stopper 25. The upper internal threaded portion 15 is of the same size or slightly larger than the diameter of the bore so that the drill or rubber plug may be freely inserted or removed from the T. Additionally, the enlarged bore portion 23 shown in Figure 4 provides means for preventing the rubber plug from being blown out of the T by the high pressure of the gas or water passing through the main. While the service T, nipple, or fitting 11 is shown welded to the main it will be manifest that it may be connected to a service clamp which is secured to the main before the fluid outlet 22 is drilled in the main.

It will be understood that the forms of the invention shown and described are merely illustrative of preferred embodiments and that such changes may be made as come within the purview of one skilled in the art and the scope of the following claims.

We claim:
1. A service T of the class described having an axial through bore and a lateral outlet, said bore being of unrestricted diameter throughout its length and extending past the lateral outlet, said bore arranged to receive a full size drill of substantially the same diameter as the bore, the wall of said bore constituting a rigid guide and support for the full size drill above and below said lateral outlet, and one end of the service T having an internally threaded portion, the smaller diameter of said internal threaded portion substantially coinciding with the diameter of the bore at the juncture therewith to allow insertion of the full size drill into the bore.

2. A service T of the class described having an axial through bore and a lateral outlet, said bore being of unrestricted diameter throughout its length and extending past the lateral outlet, said bore arranged to receive a full size drill of substantially the same diameter as the bore, the wall of said bore constituting a rigid guide and support for the full size drill above and below said lateral outlet, one end of the service T having an internally threaded portion, the smaller diameter of said internal threaded portion substantially coinciding with the diameter of the bore at the juncture therewith to allow the insertion of the full size drill into the bore, said bore below said lateral outlet having an enlarged shoulder portion, and a rubber expansible stopper insertable in the bore when the drill is removed therefrom, said stopper being arranged when moved adjacent to the enlarged portion of the bore to expand outwardly and engage the shoulder of the bore.

3. A service T of the class described having an axial through bore and a lateral outlet, said bore being of unrestricted diameter throughout its length and extending past the lateral outlet, said bore arranged to receive a full size drill of substantially the same diameter as the bore, the wall of said bore constituting a rigid guide and support for the full size drill above and below said lateral outlet, one end of the service T having an internally threaded portion, the smaller diameter of said internal threaded portion substantially coinciding with the diameter of the bore at the juncture therewith to allow the insertion of the full size drill into the bore, and said bore below said lateral outlet having an enlarged shoulder portion constituting an abutment for an expansible stopper insertable in said bore.

FRANK H. MUELLER.
JOHN J. SMITH.

REFERENCES CITED

The following references are of record in the file of this patent:

UNITED STATES PATENTS

| Number | Name | Date |
|--------|------|------|
| 937,958 | Phillips | Oct. 26, 1909 |
| 2,309,253 | Newell | Jan. 26, 1943 |
| 2,310,351 | Bowman | Feb. 9, 1943 |
| 2,336,173 | Henderson | Dec. 7, 1943 |
| 2,344,163 | Misch | Mar. 14, 1944 |